Jan. 3, 1967   P. G. JONSSON   3,296,380
AUTOMATIC LOUD SPEAKER INTERCOMMUNICATION TELEPHONE SYSTEM
Filed March 13, 1963   11 Sheets-Sheet 1

INVENTOR.
PER GUSTAF JONSSON
BY Phillip A. Weiss
atty

INVENTOR.
PER GUSTAF JONSSON

Jan. 3, 1967    P. G. JONSSON    3,296,380
AUTOMATIC LOUD SPEAKER INTERCOMMUNICATION TELEPHONE SYSTEM
Filed March 13, 1963    11 Sheets-Sheet 11

Fig.12

INVENTOR.
PER GUSTAF JONSSON
BY Phillip G. Weiss
Atty

United States Patent Office 3,296,380
Patented Jan. 3, 1967

3,296,380
AUTOMATIC LOUD SPEAKER INTERCOM-
MUNICATION TELEPHONE SYSTEM
Per Gustaf Jonsson, Ronninge, Sweden, assignor to International Standard Electric Corporation, New York, N.Y., a corporation of Delaware
Filed Mar. 13, 1963, Ser. No. 264,816
Claims priority, application Sweden, Mar. 14, 1962, 2,812/62
12 Claims. (Cl. 179—18)

This invention refers to an automatic loud speaker telephone system of the intercommunication type intended for internal communication within for instance enterprises and other organizational units of considerable size. The purpose of loud-speaker intercommunication telephone systems is to enable direct conversations between different officials or people without them having to leave their rooms or the work they are handling. It is important that the connection be established rapidly and that high acoustical qualities be attained so that misunderstandings can be avoided.

In existing systems of this type, groups of keys or push buttons have generally been provided in the extension subsets and said subsets have been connected to each other directly, thus making it possible to make straightforward calls from one extension to another. Systems of this type make possible fast and good connections, but they are expensive and complicated when a considerable number of extensions are involved because of the extensive cabling that will be necessary. Thus they are not suited to installations having a large number of extensions.

It has also been proposed to use automatic exchanges in loud speaker systems in which the connections are established by means of telephone dials which position the selecting means of the exchanges. However, systems of this type are also very expensive, as the whole telephone system has to be designed along the same general principle as long line telephone systems, where pulses are sent by tone frequencies over the speech wires. These systems can either have two leads for speech in one direction and two leads for speech in the opposite direction, i.e. a connection of the duplex type, or one single pair of leads for two-way connections, i.e. simplex type, in which latter case the amplifiers have to be connected in branch circuits provided by hybrid connections.

Systems of this type are also very expensive, and it is difficult to obtain satisfactory stability and a guarantee against self-excited oscillations in the speech circuits in more economic designs.

The object of the instant invention is to eliminate the drawbacks mentioned above. This is accomplished with a loud speaker telephone intercommunication system using telephone sets provided with groups of keys and connected over four wire leads to a telephone exchange having connecting relay sets provided with selecting means for connecting a calling extension and a called extension and also having number of registers. Two leads are used for speech in one direction and two leads, are used for speech in the opposite direction. However, all four wires are adapted for the transmission of signals, thus making possible identification of criteria providing a basis for a desired connection, for instance the number of a calling and/or a called extension, a desired transfer address, etc. The invention provides simple positioning switching for the exchange and also only the required quantity of switching means and connecting leads. Thus, the cost of the installation is kept very low.

The type of switching chosen also makes possible convenient operation from the extension by means of groups of keys, and it also readily provides functions and facilities which up to now have not been found in systems of this type.

In accordance with one embodiment of the invention the calling extension is identified by calling circuits which close at the initiation of a call in connection with a first signal key being actuated in an extension subset, for instance a calling key. This determines the potential condition of the four calling leads in the register. The identification procedure is such, that two or more of the four leads of said four wire leads are connected together by means of each signal key pressed at the extension. The polarity of two of said leads is established in a first measuring step in response to the application of a predetermined polarity to a third of said leads and it is established in a second measuring step whether the polarity of said two leads, after the opposite polarity has been applied to said third lead and the same polarity as the latter has been applied to said fourth lead, is given by said third or fourth lead, respectively.

In an embodiment of the invention the called extension is identified in the register by means of a potential combination given on the four wire leads by the calling extension by the pressing of one or more keys corresponding to the called number. The register is preferably designed in such fashion that this polarity combination is converted into a numerical indication of the called subscriber. In connection with this the register can either be designed such that only the relays corresponding to the received potential combinations operate or such that all of the signal receiving relays operate upon initiation of a call and then one or more of the relays restores in the first measuring step and one or more of the remaining relays restores in the second measuring step.

The loud speaker telephone system of this invention makes it possible to place specific rapid connecting facilities at the disposal of the caller to connect the calling extension to certain other extensions with which the caller has reason to establish connections often.

In accordance with one embodiment of the invention it would be possible to use the digit keys of an extension either as digit keys for a connection established in normal manner or as direct selection or name calling keys. In the first-mentioned case it is necessary to first actuate a calling key in the extension. The digit keys are then used in normal calling fashion. If on the other hand a certain digit key is pressed without the calling key being actuated a connection to the desired extension will be set up straightforwardly, as in the latter case the digit key will serve as a direct selection key.

In this embodiment a number of extensions, to which a certain calling extension often establishes connections, can be gathered into groups on the basis of the frequencies of calls to the same from said calling extension. The individual extensions in each group can also be included in other groups which can be reached by other calling extensions by the actuation of a digit key serving as a direct selection key.

In accordance with another embodiment of the invention the arrangement can be such, that a calling extension establishing a connection to a busy extension can hold his connection for a predetermined time and then will be connected directly to the called extension if the latter completes his conversation within said predetermined time.

By means of another facility of the telephone system of the invention actuation of a signal key in an extension can cause calls subsequently coming to said extension to be transferred to another extension.

The invention will be described in detail below with reference to the accompanying drawings, which illustrate the telephone system of the invention. FIGURE 2 is a grouping plan showing how FIGURES 3–11 are to be placed with respect to one another in order to form a complete switching diagram for an embodiment of the telephone system of the invention.

Figure 1:
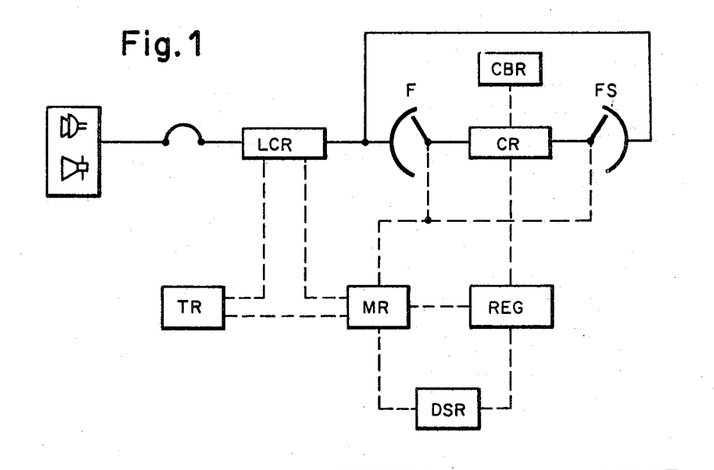
FIGURE 1 is a block diagram of an embodiment of the telephone system of the invention.
Figure 2:
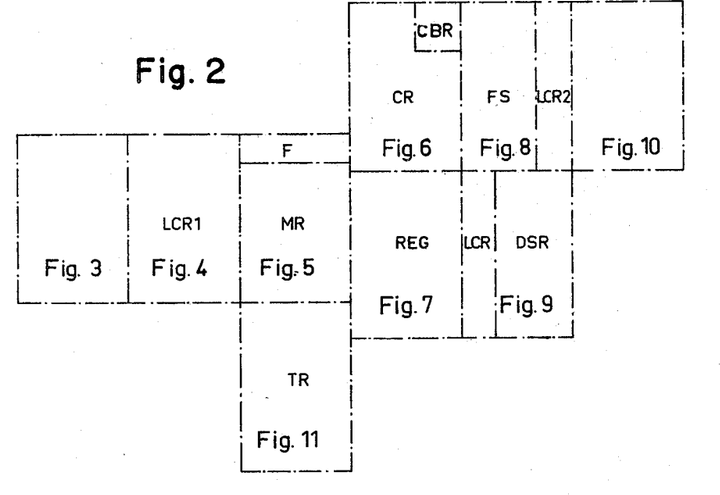

FIG. 1 shows the invention in block diagram form. The following designations are used in the block diagram:

LCR—line relay set
F—finder
FS—final selector
CR—connecting relay set with amplifier
REG—register
CBR—camp-on-busy relay set
DSR—relay set for direct selection
MR—marker relay set
TR—relay set for transfer connection Connection to the exchange is effected by pressing a digit button corresponding to the first digit in the called extension number desired. The calling extension is identified in the line circuit LCR and the marker MR. The marker MR hunts for an idle connector CR and connects this to the calling extension via the finder F. At the same time the register REG is connected to the connector CR. After the digital information has been registered in the register REG, dialling tone is transmitted to the calling extension. The digit button may now be released, and the remaining figures of the extension number may be keyed. After the last digit button has been released, immediate connection to the called extension is effected via the final selector FS.

By the introduction of a specific direct selection unit DSR in the exchange the digit buttons may also be used for direct selection of 10 extensions. Staff extensions, between which there is normally a high level of traffic, may thus be grouped for fast mutual connection. The grouping of the extensions is optional, and direct selection may be made from any set in a group to any of the ten direct call extensions. Grouping of the direct call extensions is carried out by simple strapping in the exchange.

In calling these direct-call extensions a specific button is first depressed until a dialling tone is heard, whereafter the button for the desired extension is pressed. Identification of the calling extension is effected when the specific button is depressed, in the same manner as described above. Furthermore, the specific unit DSR is engaged and the group relay in this unit is operated. When the button for the desired extension is pressed, the final selector FS makes the connection.

The transfer unit TR is introduced into the exchange when a transfer facility is desired:

A party wanting to transfer incoming calls without answering them does this by setting up a connection to the extension to which he wishes to have them transferred, whereafter he presses a specific transfer button on his set. Preferably he should also inform the party having the last-mentioned extension that a transfer connection will be made. As soon as the specific button is depressed, identification of the calling number takes place, whereafter an idle transfer unit TR will be connected. The transfer unit TR takes over both the calling and the called number. After the registration has been made, the connection will be released and the pilot lamp in the transfer-connected set will flash.

The transfer-connected set may be used in normal manner for outgoing calls.

A calling extension will receive a specific two-tone ringing signal when the connection is made as an indication that the call has been rerouted.

The transfer connection is cancelled by the specific transfer button on the transfer-connected set being depressed again. The TR unit will then be released and the pilot lamp will be extinguished at the same time.

A call to a busy extension will normally be released after about 10 seconds. However, as an extra facility, the exchange may be provided with a camp-on-busy device CBR. By the introduction of this unit all calls to a busy extension will be placed in waiting condition for about 30 seconds.

If the busy extension becomes free during this interval it will be called in the ordinary manner.

Should the busy extension not become free during the waiting period the call will automatically be released. However by pressing a specific camp-on-busy button it is to extend the waiting time by another 30 seconds.

Pressing the last mentioned specific button causes a short speed-up-tone to be transmitted to the busy extension to indicate that a call is waiting. If the busy party should desire to answer the call he may do this by releasing the first connection in the ordinary manner.

Figure 3:
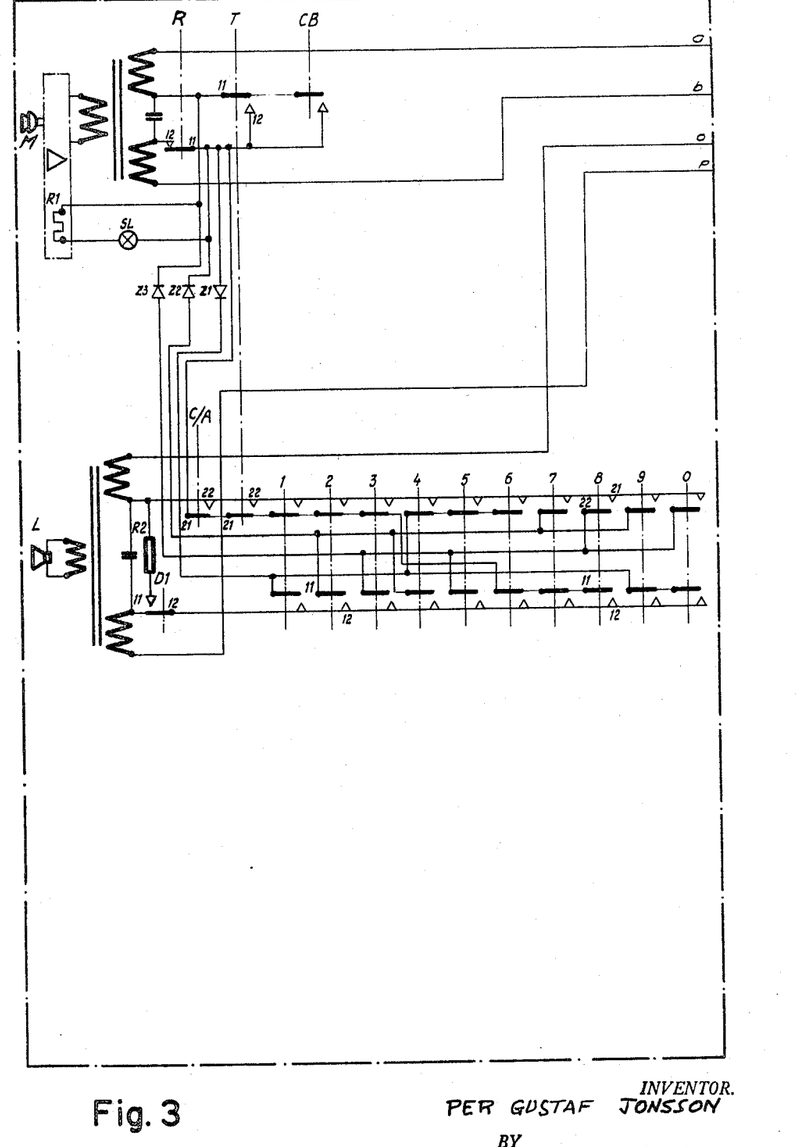
FIGURES 3–11 are circuit diagrams representing equipment in the embodiment mentioned in conjunction with FIGURE 2 and FIG. 12 schematically shows a subset used in the inventive system.
Figure 4:
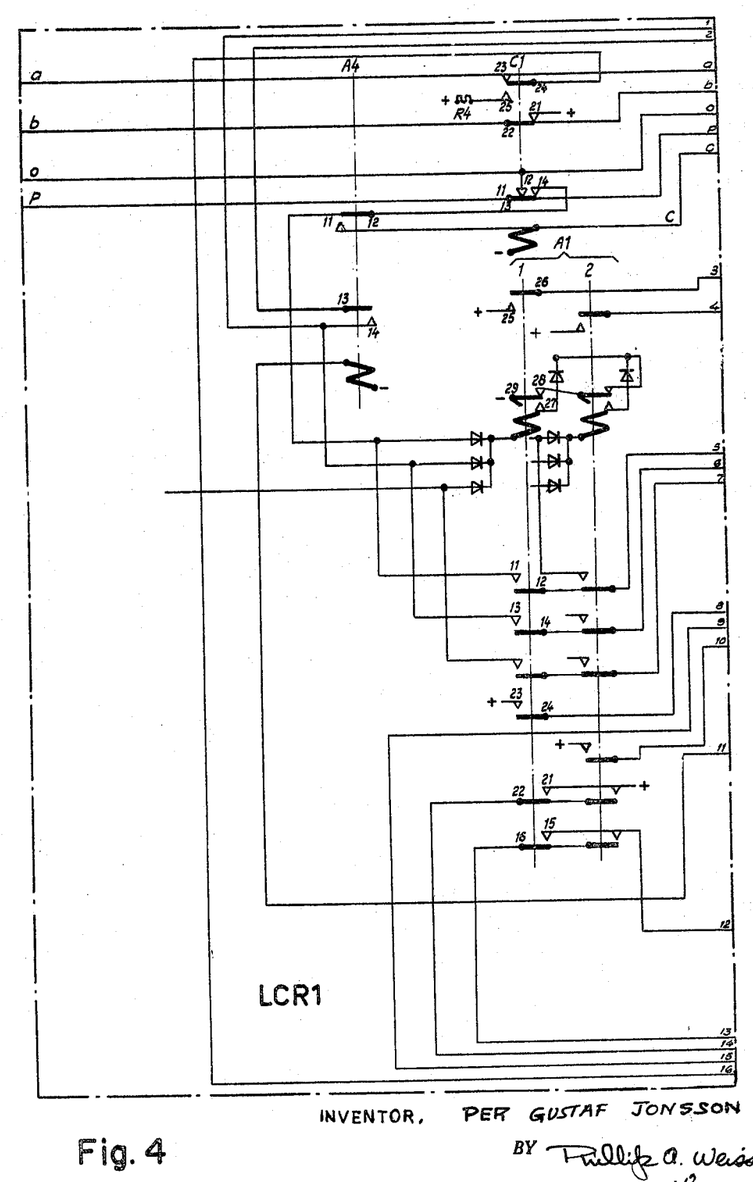
Figure 5:
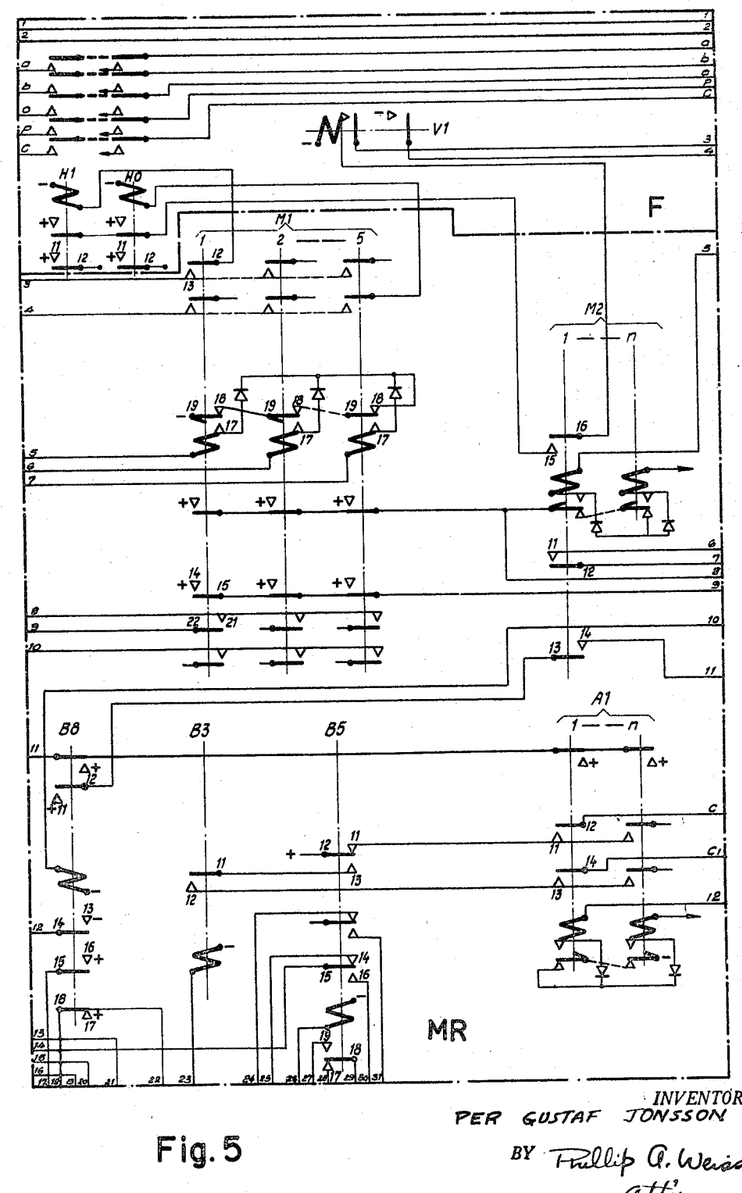
Figure 6:
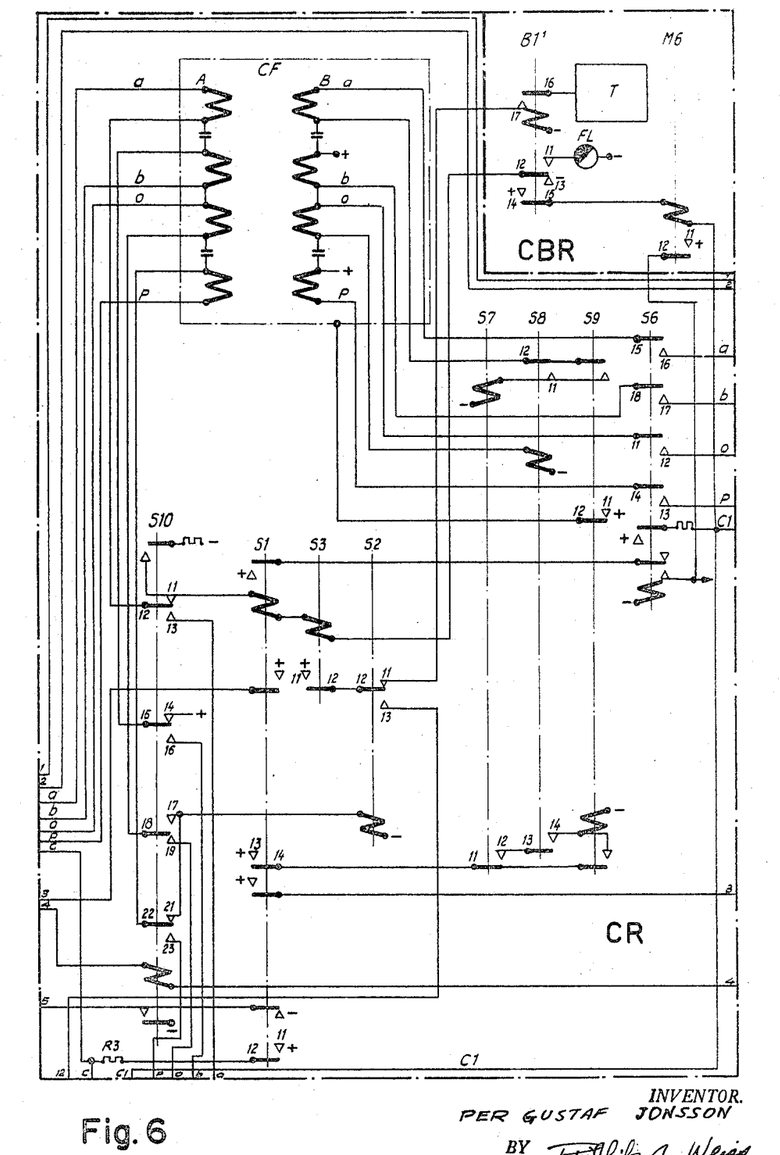
Figure 7:
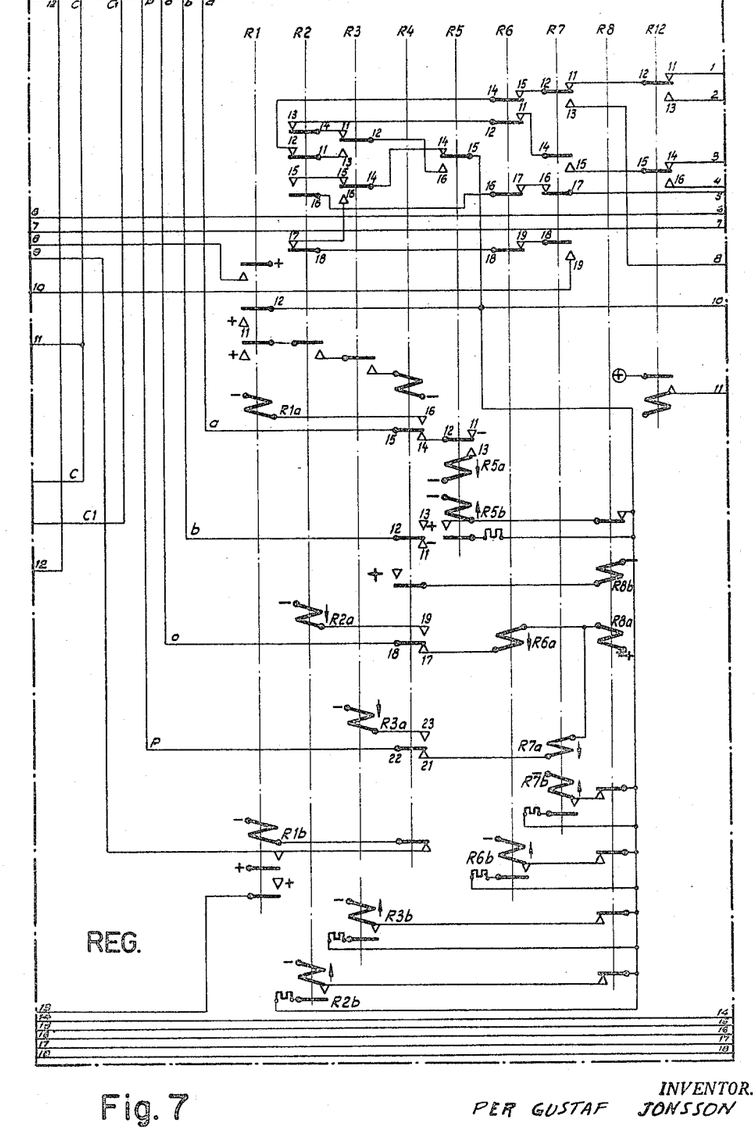
Figure 8:
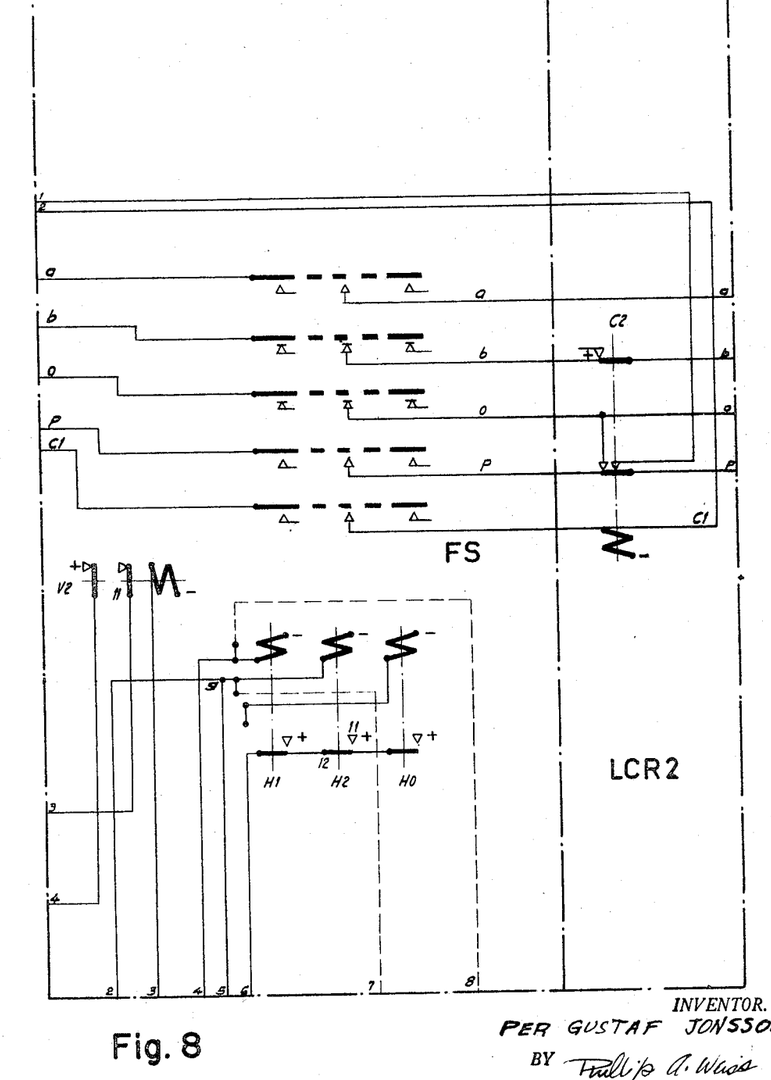
Figure 9:
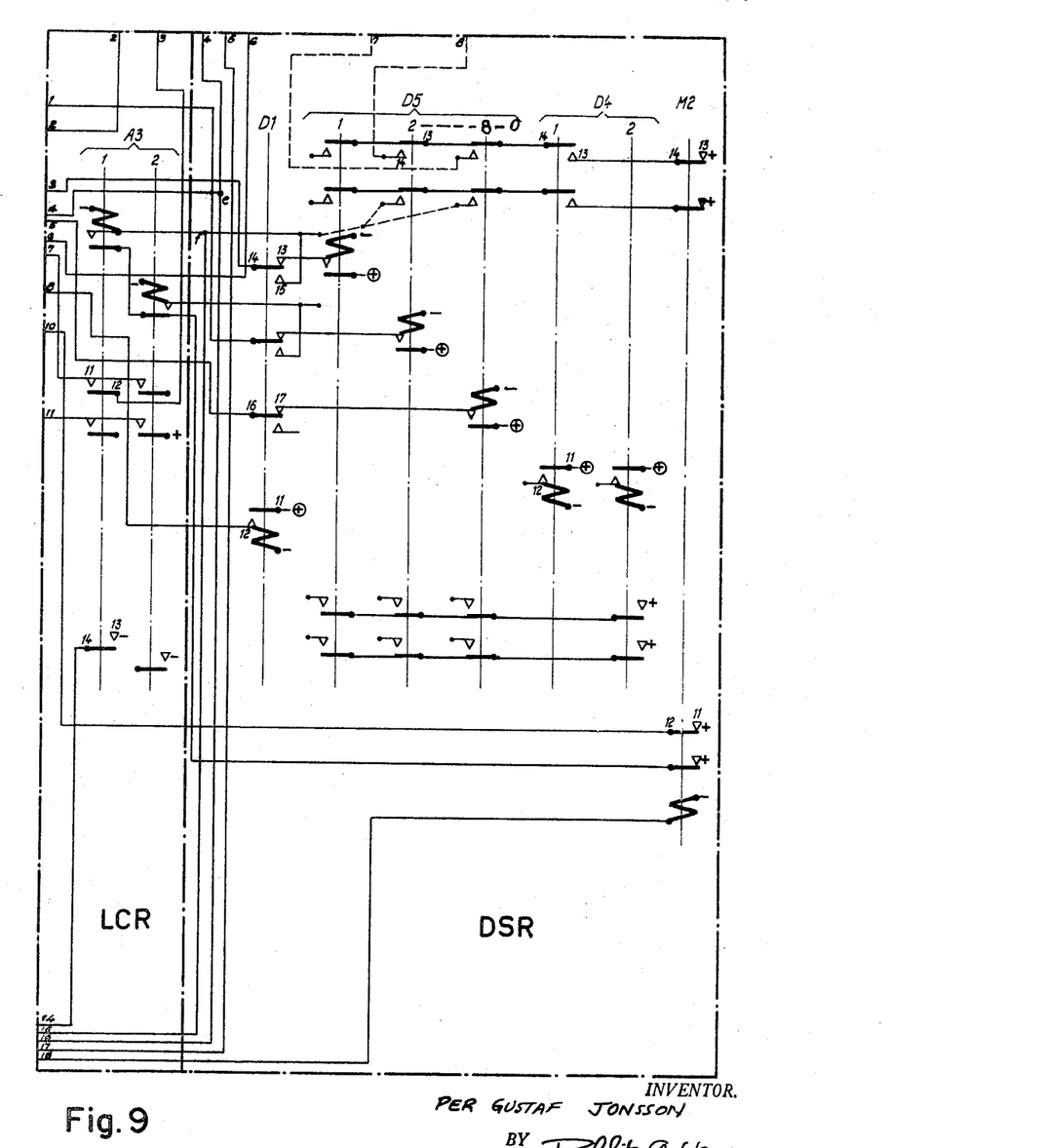
Figure 10:
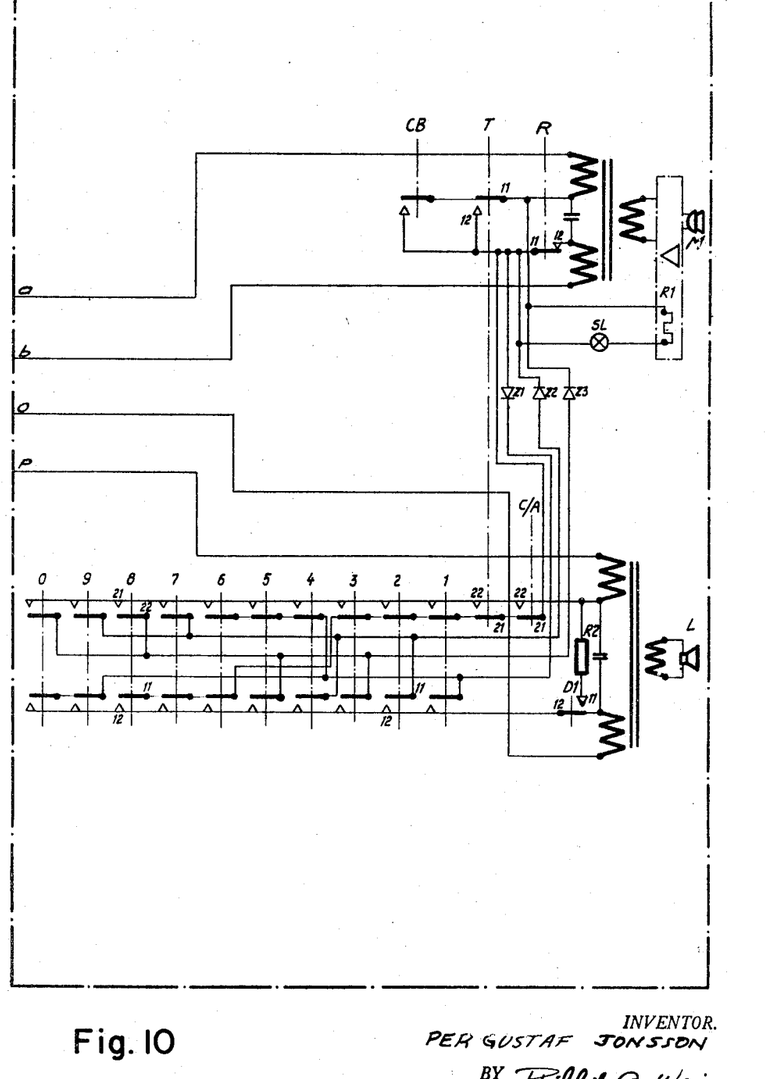
Figure 11:
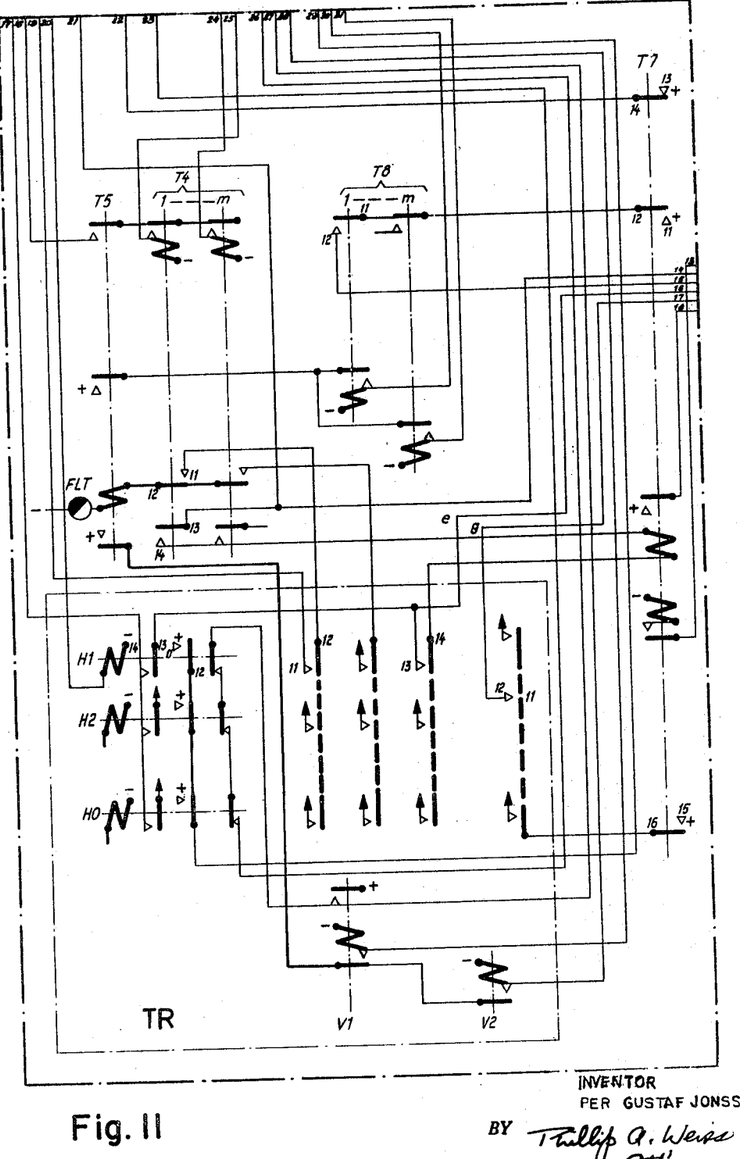
Figure 12:
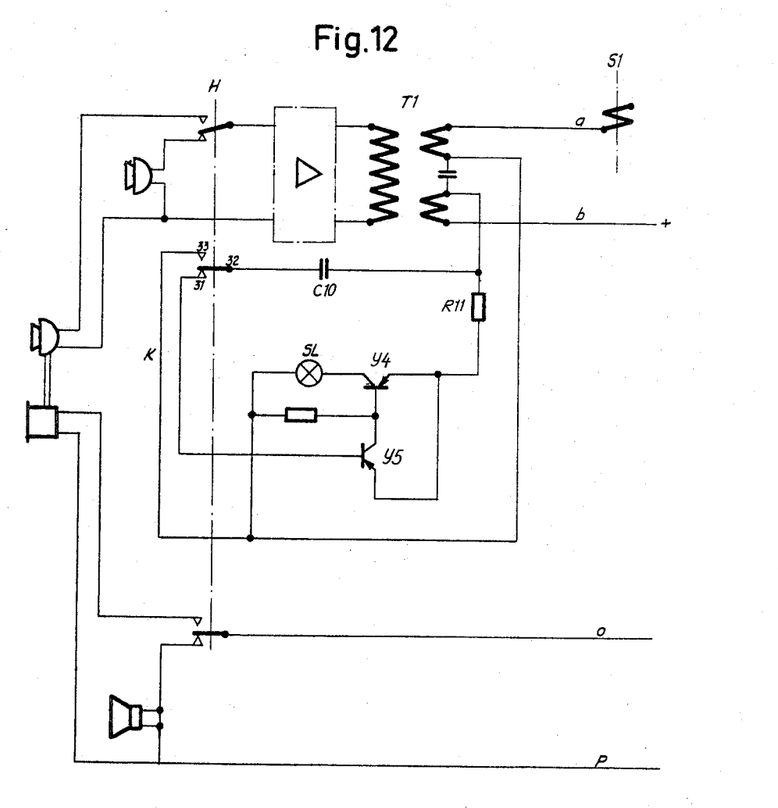

In order that a waiting extension may not be disturbed by the busy tone during the waiting period this tone is cancelled when the specific button is pressed and is replaced by the flashing of the pilot lamp. The busy tone is received again during 10 seconds before the automatic release. Thus FIGURE 3 shows the loud speaker telephone subset for the calling extension in said embodiment. FIGURE 4 shows LCR1=the line relay circuit of the calling extension in said embodiment. FIGURE 5 shows F, MR=a crossbar selector and a marker relay set, respectively, of said embodiment. FIGURE 6 shows CR, CBR=a connecting relay set with amplifier and a relay set for waiting when connected to a busy extension, respectively, in said embodiment. FIGURE 7 shows a register and FIGURE 8 shows FS, LCR2=a crossbar selector and a relay set of the called extension, respectively, of said embodiment. FIGURE 9 shows LCR, DSR=a line relay set and a relay set for direct calls respectively, in said embodiment. FIGURE 10 shows the loud speaker telephone subset for the called extension, and FIGURE 11 shows TR=a relay set with a crossbar selector for transfer connection in said embodiment. The functioning of the individual relay sets will be apparent from the following detailed description:

It may be assumed that extension No. 11 of FIG. 3 is to make a call to extension No. 12 of FIG. 10. It may also be assumed that this call is to be made by number selection. The person at the calling extension begins by pressing the calling key C/A in his subset. Contacts 21, 22 for key C/A are thereby closed, and positive potential is applied to leads $o$ and $p$ from lead $b$ over contacts 21, 22 of relay C1 in LCR1. Positive potential on leads $o$ and $p$ is conducted over contacts 12, 14 and 11, 13 of said relay C1 to relay A1$^1$ in the line relay circuit LCR1. The latter relay operates, thereby identifying the fives group in which the calling extension is located. The two relays A1$^1$ and A1$^2$ together form the tens relay of the calling extension. By operation of relay A1$^1$ said positive potential is conducted over contacts 11, 12 thereof to relay M1$^1$ in the marker relay set MR and from there on to negative over contacts 18, 19 of relay M1$^1$. Thus the calling extension is identified and the horizontal magnet H1 in crossbar selector F can be operated over contacts 25, 26 of relay A1$^1$ and 13, 12 of relay M1$^1$. At the same time as said horizontal magnet operates a free connecting relay set is selected by a selection chain M2 in marker relay set MR, which in this example makes relay M2$^1$ operate. The vertical magnet V1 associated with the selected connecting relay set now operates over contacts 15, 16 of relay M2$^1$ whereafter the calling extension is to be connected to the register over the selected connecting relay set. This connection has been prepared by relay R1 in the register REG previously operating over contacts 14, 15 of relay M1$^1$. When relay R1 operates relays R2, R3, R5, R6 and R7 will also operate as a result of positive potential over contacts 11, 12 of R1. When relays R2 and R3 have operated relay R4 will operate. Thereafter relay R8 operates. Thus at this point all the relays R1–R8 will be operated. Relay S10 in connector CR has operated previously when vertical magnet V1 operated. Operation of S10 makes relay S1 operate but not S3, which has low resistance. When S1 operates the calling extension's break relay C1 operates over contacts 11, 12 of relay S1 and over the vertical of the crossbar selector. The identification relays A1[1] and M1[1] are thereby restored. The operated relay M2[1] in selection chain M2 is held from relay R1 in register REG.

It is now to be ascertained which key in the calling extension's subset is being pressed. This is done by means of relays R2–R8 in REG. As mentioned above key C/A is the one in question, which means that leads $a$, $b$, $o$ and $p$ are connected over selector F, which is operated as described above, over transformer windings A in the connecting relay set CR and over transfer contacts of relay S10, whereafter lead $a$ runs to the winding R1$a$ of relay R1 to negative potential, lead $b$ runs to positive potential on relay R4 (contacts 12, 13), lead $o$ runs to negative potential on winding R2$a$ of relay R2 and lead $p$ runs to negative potential on winding R3$a$ of relay R3. (Relay R4 has operated previously, as described above.) As has been explained above relays R2 and R3 have operated previously (on windings R2$b$ and R3$b$). As, such as is described in connection with identification above, when key C/A is pressed lead $b$ is connected to lead $o$ over make contacts 22, 21 of key C/A in the subset, a current will now flow through winding R2$a$, which magnetizes in the opposite direction compared to winding R2$b$, thereby causing relay R2 to restore. Positive voltage to this path is obtained from contacts 11, 12 of relay R4. Relay R3 remains operated, because winding R3$a$, which magnetizes in the opposite direction compared to winding R3$b$, does not receive any current as lead $p$ is non-conducting. When relay R2 releases relay R4 will also release, thereby shifting the respective contacts 14, 15, 16; 11, 12, 13; 17, 18, 19 and 21, 22, 23 for the respective leads $a$, $b$, $o$ and $p$. As leads $b$ and $o$ are connected together over key C/A as described above, relay R6, which has previously operated by means of winding R6$b$ as described above, now receives a current in winding R6$a$, said current coming from contacts 11, 12 of relay R4 and flowing over leads $b$ and $o$, respectively, to winding R8$a$ of relay R8. As windings R6$a$ and R6$b$ counteract each other relay R6 will restore. On the other hand relay windings R8$a$ and R8$b$ do not counteract each other, so relay R8 is kept operated as long as key C/A is pressed. When relay R2 restored as above and relay R6 now restored relay D1 in DSR will operate over the following path: Positive over contacts 11, 12 of relay M2 in DSR, contacts 15, 16 of relay R5 in REG, 12, 13 of R3, 11, 12 of R2, 14, 15 of R6, 12, 13 of R7, through the winding of relay D1 and to negative. Relay D1 holds itself over its contacts 12, 11 to positive. Operation of relay D1 thus indicates that key C/A is pressed. Dialing tone is now sent to the calling extension and the person calling can release key C/A. This makes relay R8 restore, whereafter all of the relays R2–R8 are operated again, as relay R1 remains operated. Relay R1 remains operated as it is held over winding R1$b$ during signal registration and over winding R1$a$ and the loop formed by leads $a$, the subset and leads $b$ when no key is depressed. When relays R2–R8 operate again, reception of the digits of the called extension's number one at a time is prepared. As stated above it has been assumed that the call is to be made to extension No. 11. The calling person thus now presses key "1." This connects lead $b$ directly to lead $o$ and over a diode Z1 to lead $p$, said diode being connected in such direction that it will pass positive potential from lead $b$ towards lead $p$ but not in the opposite direction. Relays R2 and R3 will now restore, as current will flow in their respective windings thus magnetizing the hold windings in the opposite direction. In the same manner as above relay R4 will now restore, thus shifting leads $a$, $b$, $o$ and $p$ on the transfer contacts of relay R4 in the same way as has been described above and connecting windings R6$a$ and R7$a$ to leads $o$ and $p$. However, contrary to the case described above, no current will flow through winding R7$a$, because rectifier Z1 is connected to block negative from lead $b$. However, current will flow through winding R6$a$, thus restoring relay R6 as described above. The tens digit of the called extension is now registered on relays A3 in line relay circuit LCR over the following path: Positive over contacts 11, 12 of relay M2 in direct call relay set DSR, contacts 15, 16 of relay R5 in register REG, 12, 11 of R3, 14, 13 of relay R2, 12, 11 of relay R6, 14, 15 of relay R7, 15, 14 of relay R12 and 14, 15 of relay D1 in direct call relay set DSR, through winding of relay A3[1] in line relay circuit LCR and to negative. Relay A3[1] thus indicates the tens in question. When relay A3[1] operates relay R12 in register REG will operate, thus shifting the leads from the signal receiving relays R2–R8 over contacts 11, 12, 13 and 14, 15, 16, respectively, of relay R12, which makes the connection ready to receive the units digit of the called extension. When the person calling releases the key for the tens digit relay R8 will restore, whereafter all of the relays R2–R8 will operate as described above. When the person calling presses the key for the units digit, i.e. in this example for the digit "2," lead $b$ will be connected straightforwardly to lead $o$ over key 2 to lead $p$ over rectifier Z2, which is connected in such a manner as to block positive potential from lead $b$. Relays R2–R8 will now take the following positions: R2 released, R3 operated (as no current flows through its winding R3$a$ because of the way in which rectifier Z2 is connected), R4 released, R5 operated, R6 released, R7 released (as a current flowing through winding R7$a$ counteracts the current in winding R7$b$ over the following path: Negative over contacts 11, 12 of relays R4, over lead $b$, over diode Z2, contacts 11, 12 of key 2, lead $p$, contacts 22, 21 of relay R4 and winding R7$a$ of relay R7 and to positive over winding R8$a$), and R8 operated. The units digit of the called extension will now be registered on a horizontal magnet in the crossbar selector FS of the calling extension over the following path: Positive over contacts 11, 12 of relay M2 in (direct call relay set) DSR, over contacts 15, 16 of relay R5 in register REG, 12, 13 of R3, 11, 12 of relay R2, 14, 15 of relay R6, 12, 11 of relay R7, 12, 13 of relay R12 and to negative over horizontal magnet winding H2. A vertical of the crossbar selector of the called extension is now to be operated. This vertical is determined on one hand by the tens digit of the called extension, i.e. in this example relay A3[1] in line relay circuit LCR and on the other hand by the connecting relay set CR connected to the register as determined by relay M2[1] in MR. The current follows the following path: Positive over contacts 11, 12 of horizontal magnet H2 in FS, over contacts 11, 12 of relay M2[1] in MR, contacts 11, 12 of relay A3[1] in line relay circuit LCR and to negative over vertical winding V2 in crossbar selector FS. Vertical V2 is thereafter held from relay S1 in connector CR. A test to ascertain if the called extension is free is effected in conventional manner by sensing the test lead of said extension. When vertical V2 operates relay S10 restores and the register is disconnected.

It may first be assumed that the test has shown the called extension to be free. Relay S6 in connecting relay set CR then operates and makes the break relay C2 in circuit LCR2 for the called extension operate, thereby connecting the speech wires of the called extension to said connecting relay set. Calling tone is sent to the called extension at the same time as a tone indicating that calling tone is being sent out is sent to calling extension.

If on the other hand the called extension is busy relay S6 does not operate. The calling extension receives busy tone in this case. Whethter the called extension is free or busy, the connecting path is held from relay S1, which is connected in the loop circuit in the following path: Negative over contacts 13, 12 of relay B1[1] in busy connecting relay set CBR, through the winding of relay S3 in connector CR, through the winding of relay S1, contacts 11, 12 of relay S10, lead $a$ over selector F, along lead $a$, through the subset of the calling extension including a resistance and a pilot lamp, along lead *b*, through selector F, lead *b* again and over contacts 15, 14 of relay S10 to positive.

As the case may be, the calling person may wish to wait if the called extension is busy. This can be done in the telephone system of this invention, as the connecting path can be held for a limited time, the so-called camp-on busy facility. If the called extension becomes free during this period the connection will be completed thereto automatically.

Disconnection of a communication path is effected by pressing key R, which breaks the above-mentioned loop over its contacts 11, 12, thereby restoring relay S1 in connector CR and thus disconnecting the communication path.

If the person calling wishes to wait for a busy extension to become free he presses key CB in his subset. This short circuits the resistance lying between leads *a* and *b* and being formed by pilot lamp SL in the subset and the resistance R1 of the microphone amplifier of the subset. Said short circuit enables relay S3 in connector CR to operate. This relay has not been able to operate previously in series with the above-mentioned resistance as said relay has a low ohmic resistance. Relay B¹ in busy connector CBR now operates over contacts 11, 12 of relay S3, thereby connecting a time supervision circuit T in busy connector CBR and a supervisory relay M6 to the test wire of the called extension from contacts 11, 12 of relay B¹. Busy tone is now disconnected and simultaneously pilot lamp SL of the called extension, which previously has shown a steady light, will now begin to flash. This occurs over the following path: Negative over a flash circuit FL in busy connector CBR, over contacts 11, 12 of relay B1¹ in busy connector CBR, the winding of relay S3 in connector CR, the winding of relay S1 in connector CR, contacts 11, 12 of relay S10 in connector CR, lead *a*, crossbar selector F, lead *a* again, resistance R1 in the amplifier of the calling extension's subset, pilot lamp SL, contacts 11, 12 of release key R, lead *b*, selector F, lead *b* again and contacts 15, 14 of relay S10 to positive. If the called extension becomes free while time supervision is being effected, supervisory relay M6 in busy connector CBR will operate in series with the called extension's break relay C2 in line circuit LCR, whereafter relay S6 in CR will operate over contacts 11, 12 of relay M6. Thereafter the connection will continue in connector the manner described above. Exactly at the same time when the calling extension is connected to the called extension, which has just become free, a short tone indication is sent to the subset of the calling extension from relay B1¹. (This is not shown in the switching diagram.) If the called extension does not become free during the time determined by time supervision circuit T relay B1¹ in busy connector CBR restores. This relay has previously been held over its contacts 16, 17 from the time supervision circuit after relay S3 in connector CR has restored when the calling person has released key CB. When relay B¹ thus now releases the called extension receives busy tone again and its pilot lamp SL stops flashing and shows a steady light. If desired, the calling extension can be put into waiting or camp-on busy condition again by key CB being pressed again, the same procedure as above then being repeated.

It is a general desire that in a call to an extension the speech connection is not to be established until the equipment has received information from the called extension that the call can be accepted. This information can in the present case be given in two ways. For instance, one may wish to receive calls without performing a manual operation for each individual call. This can be attained by means of the so called direct-in facility by pressing locking key DI of the subset, thereby connecting a resistor R2 between leads *o* and *p* over the contacts 11, 12 of key DI. Resistor R2 and the signal receiving relays of the register are dimensioned such, that signalling is not affected by resistor R2 being connected. When thus key DI is in down position and a call is received the following occurs: Relay S8 in connector CR operates over a path from negative, through the winding of relay S8, along lead *o*, over make contacts 11, 12 of relay S6, over the crossbar selector FS of the called extension, along lead *o* to the subset of the called extension, over resistor R2 in said subset and contacts 11, 12 of key DI, along lead *p* to crossbar selector FS again, lead *p* over contacts 13, 14 of relay S6 and to positive over transformer winding B. When relay S8 has operated relay S7 in CR will operate in the following loop: Negative over the winding of relay S7, contacts 11, 12 of relay S8, lead *a* to contacts 15, 16 of relay S6, lead *a* to crossbar selector FS and from there to the called extension, resistor R1 and pilot lamp SL, back along lead *b*, through selector FS, over contacts 17, 18 of relay S6 and to positive over transformer winding B. When relay S7 has operated relay S9 will operate from positive over contacts 13, 14 of relay S17, 11, 12 of relay S7, 13, 14 of relay S8 and the winding of relay S9 to negative. Relay S9 actuates the central amplifier CF (by means of contacts 11, 12 of relay S9) so that a speech connection is established between the calling extension and the called extension. Before the speech connection is completed calling tone is sent to the called extension and then the conversation can begin immediately.

However, the case may be that the called person wishes to accept the call by means of a manual operation. In this case key DI should not be locked in its down position. When a call is made the called person accepts it by pressing key C/A. This operates relay S8 in CR over the following path: Negative over the winding of relay S8, lead *o*, contacts 11, 12 of relay S6, along lead *o* through crossbar selector FS, along lead *o* of the called extension, over contacts, 22, 21 of key C/A, along lead *b*, through crossbar selector FS, over contacts 17, 18 of relay S6 and to positive over transformer winding B. Relays S7 and S9 will operate subsequently over the paths given above and the speech connection will be effected.

It is a general desire that extensions to which calls are often made should be reached quickly and with a minimum of inconvenience. With the object of accomplishing this the system of the instant invention has been designed thus, that on one hand key C/A has to be pressed before the digits of an ordinary extension number are taken and on the other hand that a certain extension among a number of predetermined extensions can be reached merely by the pressing of a predetermined number key once. This is called name selection or direct selection and will be illustrated by means of an example.

Each extension is represented by a make contact to positive on a horizontal magnet winding, for instance contacts 11, 12 of horizontal magnet H1 in crossbar selector F. Each make contact to positive as above can be individually strapped to one relay among several relays D4 in direct call relay set DSR, thus causing said relays to operate upon a call from the extension in question. Contact 12 of horizontal magnet H1 in crossbar selector F could thus for instance, as in the embodiment illustrated, be strapped to contact 12 of relay D4¹. This relay represents a group of ten extensions which can be reached by the pressing of a certain key for each extension. By the pressing of key 8 it is possible to reach the same extension (in the example chosen) that would be reached by pressing key C/A and thereafter keys 1 and 2. When key 8 is pressed the respective contacts 21, 22 and 11, 12 thereof will be brought together, thereby connecting lead *b* to lead *p* over contacts 11, 12 of key 8 and lead *a* over rectifier Z3 to lead *o* over contacts 22, 21 on key 8. Identification, selection of a free connecting relay set and connection of the register is effected in the same manner as in the number selection described above.

In the register relays R2–R8 operate in a manner corresponding to the key that is pressed. In this example, relays R3, R5, R6 and R7 restore and the other relays remain operated. Contrary to the case described above relay R5 now restores and the reason for this is the following: After relay R4 has restored relay R6 restores over a path with negative over winding R5a, contacts 13, 12 of relay R5, contacts 14, 15 of relay R4, lead a, contacts 13, 12 of relay S10, lead a to the crossbar selector F of the calling extension, through said crossbar selector, to the calling extension's subset, through rectifier Z3, over contacts 22, 21 of key 8, along lead o to crossbar selector F again, along lead o to contacts 18, 19 of relay S10 and on lead o to contacts 18, 17 of relay R4, through winding R6a of relay R6 and to positive over winding R8a of relay R8. Relay R6 now restores because windings R6a and R6b magnetize in opposite directions. At the same time relay R5 restores as windings R5a and R5b counteract each other. Relay $D5^8$ in DSR now operates over the following path: Positive over contacts 11, 12 of relay M7 in DSR, contacts 15, 14 of relay R5 in REG, contacts 14, 15 of relay R3, 15, 16 of R2, 16, 17 of R6, 16, 17 of R7, 16, 17 of D1 in DSR and to negative over winding $D5^8$ in direct selection relay set DSR. As has been mentioned above relay D4 in direct selection relay set DSR has previously operated in identifying the calling extension. As key 8 in this example has been assumed to correspond to extension 12, the tens relay $A3^1$ in line circuit LCR and the horizontal magnet H2 in crossbar selector FS, respectively, are strapped each to an individual make contact on relay $D5^8$. Connection is effected to extension 12 by operation of the tens relay $A3^1$ and the horizontal magnet H2 in crossbar selector FS in spite of the fact that only one key, i.e. key 8, has been pressed. After this, connection to the called extension is effected as described above.

Of course the system can be modified in such a manner that key C/A has to be pressed before name selection and that number selection is effected exclusively by means of the digit keys and thus without a preceding pressing of key C/A.

If a person having an extension at his disposal for instance wishes to leave his room to go to a person having another extension and the calls coming to the first extension are to be transferred to the second extension this can be arranged in the following manner. First a call is made to the extension belonging to the person to whom the caller intends to go. If this person replies the caller can inform him that he intends to set up a transfer connection, and then he presses a certain key T in his subset. This will make all calls to his extension be transferred to the other extension. However, it is not necessary that the person called replies to the originating call, and the subset of the called person can also be busy. Irrespectively of this the caller can make a transfer connection by pressing his key T.

Thus, before key T is pressed a normal connection is established to another extension. The pressing of key T makes relay S3 and S2 in connector CR operate each over an individual make contact of said key, as the closure of contacts 11, 12 of key T has the same effect that has been described in the above camp-on busy connection, when key CB is pressed, so that relay S3 in connector CR operates over the path described above. The closure of contacts 14, 15 of key T makes relay S2 in connector CR operate over the following path: positive over contacts 14, 15 of relay S10 in connector CR, over lead b to crossbar selector F, to the called extension subset, directly, i.e. not over a rectifier, to contacts 21, 22 of key T, along lead o to selector F, along lead o, over contacts 18, 17 of relay S10 and through the winding of relay S2 to negative. An A1-relay in a break-out chain in marker MR operates over positive on contacts 11, 12 of relay S3 and contacts 12, 13 of relay S2. There is one individual A1-relay for each connection relay set. It is not until now that the calling extension is identified. This is done by positive being carried over contacts 12, 11 of relay B5 in marker MR and over contacts 11, 12 of relay $A1^1$, which here is assumed to be the operated A1-relay, along lead c, through selector F, on along lead c and over contacts 11, 12 of relay A4 in line circuit LCR1, said latter relay previously having been made to operate by the operated A1-relay. This path continues to the tens relay of the called extension, for instance $A1^1$ in line circuit LCR, and to negative on contacts 28, 29 of relay $A1^1$. The latter relay will thus operate. The same positive potential now continues over make contacts 11, 12 of relay $A1^1$ and through the winding of the calling extension's relay $M1^1$ in MR to negative over contacts 18, 19 of relay $M1^1$ which thereby operate. Relays A1 in line circuit LCR1 and relay M1 in marker MR are designed such, that they will not operate when positive is connected over contacts 11, 12 of relay S1 in connector CR and over resistor R3, but they will operate when positive is conducted over the path described above. When relay A4 in line circuit LCR1 operates it connects all of the extensions' c-leads to identifying relays A1 and M1 for identification in connection with the transfer facility. When relays $A1^1$ and $M1^1$ now operate the number of the calling extension is stored with its tens digit on a T4-relay in transfer circuit TR and its units digit on a vertical, for instance V1, in the crossbar selector TRV of the transfer equipment TR. A T4-relay for the tens digit operates from positive over contacts 21, 22 of relay $A1^1$, 15, 14 of B5, through the winding of relay $T4^1$ and to negative. The units digit is stored on vertical V1 in crossbar selector TRV in the following manner: The horizontal magnet H1 in TR operates from positive over contacts 23, 24 of relay $A1^1$ in line circuit LCR1, contacts 21, 22 of relay $M1^1$ in marker MR and the winding of horizontal magnet H1 of crossbar selector TRV to negative. When horizontal magnet H1 operates, a circuit will close from positive over contacts 11, 12 of magnet H1, contacts 18, 17 of relay B5 and through the winding of vertical magnet V1 to negative. When vertical V1 operates relay B5 will operate, thereby breaking the circuit for identification of the calling extension over contacts 15, 14 of relay B5. This will make identification relays $A1^1$ and $M1^1$ and the operated horizontal magnet H1 restore. The number of the calling extension is now stored with its tens on a T4-relay and with its units on a vertical, in this case V1, in crossbar selector TRV. When horizontal magnet H1 has restored relay B3 in marker MR will operate, thereby connecting the identification circuit of the called extension from positive and over contacts 12, 13 of relay B5, contacts 11, 12 of relay B3, contacts 13, 14 of relay $A1^1$, lead $c_1$, crossbar selector FS, lead $c_1$, make contacts 13, 14 of relay A4 to relay $A1^1$ and to negative over contacts 28, 29 of relay $A1^1$. The reason that precisely relay $A1^1$ operates of all the A1-relays is that in this case the called extension has been assumed to have been No. 12. As the calling extension has been assumed to have been No. 11 both of the extensions would have the same tens digit, which explains why $A1^1$ was used previously. Relay $M1^2$ now connects over contacts 13, 14 of relay $A1^1$ to the identification path mentioned above, negative being received over contacts 18, 19 of relay $M1^2$. The tens and units digits of the calling extension are now registered with the tens on a T8-relay and the units in this case in vertical V2 in the crossbar selector of the transfer equipment. These paths of operation are identical to the paths described above for registering the calling extension but with the difference that relay B5 now has shifted. When the numbers of both of the extensions have been registered in the transfer equipment the positive potential on contact 14 of relay S10 in CR is disconnected over a path over contacts on the A1-relay associated with the connecting relay set in use and a break contact on vertical V2 in crossbar selector TRV. This path is not illustrated. As result of positive potential being removed from contact 14 of relay S10 the connection from the calling extension to the called extension will be broken down. The transfer equipment is retained over relay T5, which operated after the calling extension was identified. This path of operation runs from positive over resistor R4 in LCR1, contacts 25, 24 of relay C1, contacts 11, 12 of vertical V1 of crossbar selector TVR, contacts 11, 12 of relay T4¹, through the winding of relay T5 and over a flash device FLT to negative. When the connection breaks down, relay C1 of the calling extension will restore and the transfer equipment will then be held over the last-mentioned path but over contacts 24, 23 of relay C1 in LC1, lead $a$ to the calling extension operated, resistor R1, pilot lamp SL and lead $b$ over contacts 22, 21 of relay S1 to positive. The pilot lamp SL in the calling extension subset now flashes at a rate determined by flash device FLT and differing from the flash rate of said lamp when the subset is in camp-on busy connection, the latter rate being given by flash device FL in CBR as described above. The characteristic flash of pilot lamp SL indicates that the extension in question is in transfer position. Calls can be made in the usual manner from a subset in line circuit transfer position, and the connection is held over contacts 25, 24 of relay C1 in LCR1 while such calls are being made.

In calls to an extension in transfer position, in this case extension No. 11, the number of the called extension is registered, regardless of if said number is given by number selection or by name selection, i.e. direct selection. When the called extension's tens relay in line circuit LCR, in this case A3¹, has operated and thereafter the units digit of the called extension has been registered either on a combination of relays R2–R8 in REG or on relay D5 in direct selector DSR, relay T7 in transfer equipment TR will operate over the following path: Negative over contacts 13, 14 of relay A3¹, contacts 13, 14 of the T4-relay corresponding to the tens unit in question, i.e. in this case relay T4¹, through the winding of relay T7, over the unit marking contacts 13, 14 in crossbar selector TRV of the extension in transfer position and to positive on lead $e$, which is connected to positive either from contacts 11, 12 of relay M2 in direct selector DSR, contacts 15, 16 of relay R5 in register REG 12, 11 of R3, 14, 15 of R2, 12, 11 of R6, 14, 15 of R7, and 15, 16 of R12 or from contacts 13, 14 of relay M7, 13, 14 of D4¹ and 13, 14 of D5², the name calling-key 2 of the extnsion calling in this case having been assumed to correspond to extension No. 11. Relay T7 in transfer equipment TR thus operates if the tens relay T4¹ of the extension in transfer position corresponds to the registering tens relay A3¹ in line circuit LCR, and if the units digit stored in the transfer equipment and pertaining to the extension in transfer position is in accordance with the registered units digit. After operating, relay T7 locks itself over a hold winding. When relay T7 has operated relay M7 will also operate, the registered positive potential of the units digit and the tens digit thus being released. The number to the called extension is now replaced by the number stored in the transfer equipment and pertaining to the subset of the extension, to which transfer has been indicated. The tens digit is marked from positive over contacts 11, 12 of relay T7, contacts 11, 12 of tens relay T8¹, lead $f$ and tens relay A3¹ to negative. The units digit is marked by positive over contacts 15, 16 of relay T7, contacts 11, 12 of vertical V2 in crossbar selector TRV, lead $g$ to horizontal magnet H2 in crossbar selector FS and to negative. This horizontal magnet represents the units digit for the extension to which a connection is to be made. The switching now continues as described above, and when the connection is completed the register will release, thereby restoring relay T7 in TR. The first of the tones sent backwards to the calling extension to indicate that calling tone is being sent out has special character in a call to an extension which is transferred to some other extension. For instance the first tone can have a different frequency, such as 1000 c./s., than the following one, which for instance can have a frequency of 400 c./s. This gives the caller the information that he has not been connected directly to the extension subset desired.

The transfer equipment is released by the pressing of key T of that extension from which the transfer has been made. This results in a connection in the manner described above to connecting relay set CF and register REG. In the register an indication of the transfer key having been pressed is given by the following positions of relays R2–R7: R2 released, R3 operated, R4 released, R5 released, R6 released, R7 released. Relay B8 will now operate over the following path: Positive over contacts 11, 12 of relay M2, contacts 15, 14 of relay R5, 14, 16 of R3, 17, 18 of R2, 18,19 of R6, 18, 19 of R7 and through the winding of B8 to negative. The calling extension is now identified by positive being connected to lead $c$ of the calling extension, and identification is effected in the same manner as an extension in transfer position is identified when putting itself into transfer position. However, in the instant case the path is initiated from positive over contacts 11, 12 of relay B8, over contacts 13, 14 of the M2-relay, in this case M2¹, corresponding to the connecting relay set used, and from there on to lead $c$ mentioned above. At the same time relay B8 makes connecting relay A4 in line circuit LCR1 operate. When the correct identification relays A1 and M1 have operated, relay T7 in transfer equipment TR operates over the following path: Negative over contacts 13, 14 of relay B8, contacts 15, 16 of relay A1¹, contacts 13, 14 of relay T4¹, the winding of relay T7, contacts 14, 13 of vertical V1 in crossbar selector TRV, contacts 13, 14 of horizontal magnet H1 in crossbar selector TR, said horizontal magnet having operated as a result of identification of the units digit of the calling extension, and finaly over contacts 15, 16 of relay B8 to positive. When relay T7 operates the hold circuit for the operated tens relay T4 will be opened (relay B8 is operated) as the two break contacts 13, 14 of relay T7 and 17, 18 of relay B8, respectively, are open. Relay T5 will restore when relay T4 restores and the transfer equipment will disconnect.

The customary manner of disconnection in prior art intercommunication systems having handsets is that after the handset has been placed in its cradle it has been necessary to press a key to release the connection. This is not necessary in the system of this invention, because here the connection is actually released by the handset being cradled. This is effected in the following manner: The connection is held by relay S1 in connector CR over lead $a$ in the extension, the upper winding of transformer of T1, pilot lamp SL, transistor $y4$, which is fed with such voltages that it will have a low internal resistance, further on through resistor R11, the lower winding portion of transformer T1 and over lead $b$ to positive. If the handset now is picked up capacitor C10 will charge over contacts 32, 33 of switch H and lead $k$ to the upper portion of the winding transformer T1 and lead $a$ to relay S1 in connector CR and to negative. Capacitor CT receives positive from lead $b$ over the lower portion of transformer T1. When the handset subsequently is placed in its cradle contacts 32, 31 of cradle switch H are closed, capacitor C10 thereby discharging towards the base of transistor $y5$ and increasing the emitter-collector current of said transistor so that transistor $y4$ is choked. As transistor $y4$ now will be given large internal resistance relay S1 and thus the connection will be made to release. After capacitor C10 has discharged the loop returns to its normal condition with transistor $y4$ having low internal resistance.

The circuit as disclosed can also be modified such that when the handset is lifted a capacitor is discharged and upon subsequent replacing of said handset the capacitor is charged and thereupon discharged through the transistor circuit.

The invention is not restricted to the embodiments described above and illustrated in the drawings as these embodiments merely are shown by way of example. Thus anyone skilled in the art will find it possible to make many modifications within the scope of the invention and the claims.

What I claim is:

1. An automatic loudspeaker intercommunication telephone system serving a plurality of substations having loudspeaker key equipped telephone subsets which are connected to a telephone exchange over four wire leads, at least some of said keys at each of said subsets being specific keys individually associated with certain of said substations, said exchange comprising line circuit means individually associated to the four wire leads coming from each of said substations, means including said line circuit means for identifying calling ones of said substations responsive to a code comprising D.C. potential polarity combinations placed on the four wire leads by the operation of said keys at said calling substation, finder means operated responsive to the identification of said calling substation for completing a switching connection to said calling substation, register means for registering the directory number of called station, said register means including tens relays and units relays, relay circuit means in said register means for operating said tens relays and said units relay responsive to potential combinations placed on the four wire leads by the operation of the keys at said calling substation, selector means for selecting the line circuit means associated with the called substation responsive to directory signals received from said calling station, means at said calling substation for generating said directory signals responsive to the operation of the one of said specific keys individually associated with said called station, connector means for interconnecting said finder means and said selector means to thereby communicatively connect said calling substation to said called substation.

2. The system of claim 1 wherein calling keys are provided at said subsets, and contact means operated responsive to operation of said calling keys for interconnecting said four wire leads to place unique D.C. potentials on said four wire leads in a code identifying the subset wherein said operated calling key is located.

3. The system of claim 2 wherein signalling means are provided for interconnecting at least two of said four wire leads each time one of said keys is pressed, diode means for use in interconnecting said four wire leads, means for determining the polarities on said four wire leads in a first and a second measuring step, means for applying a predetermined polarity to a third of said four wire leads during said first step and determining the polarities on said leads, means for determining in a second measuring step whether the polarities of said leads has changed responsive to the application of a potential having a polarity opposite said predetermined polarity.

4. The system of claim 3 wherein signal receiver means are provided in said register means, said receiver comprising converter means actuated by said polarity combinations for converting said combination into numerical indications, said converter means comprising receiver relay means, means for operating all of said receiver relays responsive to the initiation of a call, and means for releasing one or more of said receiver relays during said first and during said second measuring steps.

5. The system of claim 3 wherein special key means are provided for identifying both the calling and called stations responsive to the operation of a single one of said special key means, means for grouping said substations on the basis of the frequency of calls received from other ones of said substations, and group relay means unique to each of said groups operated responsive to the operation of said special key means to connect said calling to said called substation.

6. The system of claim 5 wherein camp-on-busy means are provided for retaining the calling substation in association with a busy called substation for a predetermined time, said camp-on-busy means operated responsive to the operation of a camp-on-busy key in the subset at the calling substation, means for connecting the calling substation directly to the called substation responsive to said called substation becoming free within said predetermined period of time, and means responsive to the reactuation of said camp-on-busy key for renewing said predetermined period of time.

7. The system of claim 6 wherein means are provided for signalling said busy substation responsive to the operation of the signal key means used for calling said called substation.

8. The system of claim 7 and call transfer means, said call transfer means comprising transfer key means, transfer circuit means operated responsive to the actuation of said transfer key means for registering said substation from which the calls are to be transferred and the substation to which the calls are to be transferred, means responsive to said registration for disconnecting said substation from which the calls are to be transferred, signal means for indicating to a calling substation that the call is being transferred and for indicating at the substation from which the call is being transferred that the call is being transferred therefrom.

9. The system of claim 8 wherein means are provided for enabling calls to be made from the substation from which calls are being transferred.

10. The system of claim 1 wherein hook switch means are provided on said subsets, locking key means are provided at said subsets, means responsive to the operation of said hook-switch for connecting communicatively said calling and called substations, and means responsive to the operation of said locking key means for communicatively connecting said calling and said called stations without the operation of said hookswitch means.

11. The system of claim 10 wherein means are provided for generating an audible signal at said called station to indicate the completion of said communicative connection.

12. The system of claim 11 wherein said subsets comprise handsets, means for disconnecting said loudspeakers when connecting said handsets, said last named means comprising capacitor means, means for charging said capacitor responsive to the connection of said handsets to the circuitry of said subset, transistor means for discharging said capacitor responsive to the disconnection of said handset, said transsitor means forming a low resistance locking circuit when said handset is connected and a high resistance locking circuit when said handset is disconnected, means for controlling said high resistance to become low resistance responsive to the discharge of said capacitor.

References Cited by the Examiner

UNITED STATES PATENTS

| 2,534,854 | 12/1950 | Browne | 179—18 |
| 2,682,576 | 6/1954 | Selden | 179—18 |
| 2,909,607 | 10/1959 | Nilsson et al. | 179—18 X |

FOREIGN PATENTS

| 732,028 | 6/1955 | Great Britain. |

OTHER REFERENCES

Knauer: German printed application 1,136,379; September 1962.

KATHLEEN H. CLAFFY, *Primary Examiner.*

L. A. WRIGHT, *Assistant Examiner.*